G. D. SHARP.

Billiard-Table Cushions.

No. 5,349.

Reissued April 8, 1873.

Witnesses:

Otey Gwatkin

Edw. F. Brown.

Inventor.

George D. Sharp by B. F. James, his atty.

AM. PHOTO-LITHOGRAPHIC CO. N.Y. (OSBORNE'S PROCESS.)

UNITED STATES PATENT OFFICE.

GEORGE D. SHARP, OF NEW YORK, N. Y.

IMPROVEMENT IN BILLIARD-TABLE CUSHIONS.

Specification forming part of Letters Patent No. 26,128, dated November 15, 1859; reissue No. 5,349, dated April 8, 1873; application filed March 19, 1873.

*To all whom it may concern:*

Be it known that I, GEORGE D. SHARP, of the city, county, and State of New York, have invented certain new and useful Improvements in the Construction of Cushions for Billiard-Tables; and I do hereby declare the following to be a full, clear, and exact description thereof, reference being had to the annexed drawing making part and parcel of this my specification.

The nature of my invention consists in the construction of a cushion for billiard-tables, (composed preferably of India rubber or other elastic compound or material,) of such a form that when the billiard-ball is forced in contact with and against such cushion the ball impinges against a nearly flat, square, or perpendicular surface; also, in so molding the cushion itself that it shall have formed within it an air-space or chamber in configuration similar (preferably) to the cushion itself, in its exterior form, so that, while the material thus used is even in thickness, it allows a more delicate impress or impingement of the balls in playing, and a greater economy in the construction of the cushion itself, and the cushion thus constructed, by reason of its shape and containing within it such air-space or chamber, possesses greater power as a spring than those in common use, combining, as it does, both a rubber and air spring, also presenting to the ball a superior shelving or vanishing point of surface, especially desirable in what is termed "caroming."

To enable others skilled in the art to make and use my invention, I will proceed to describe the construction and arrangement of my improved cushion for billiard-tables.

Figure 1:
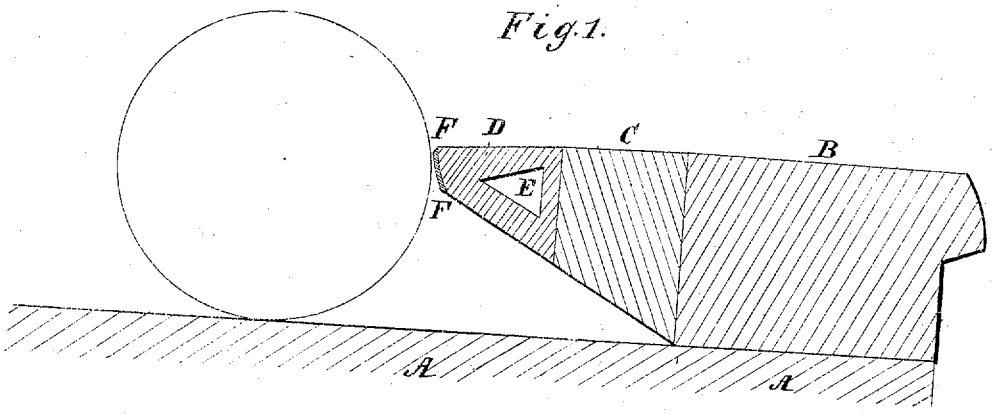
Figure 2:
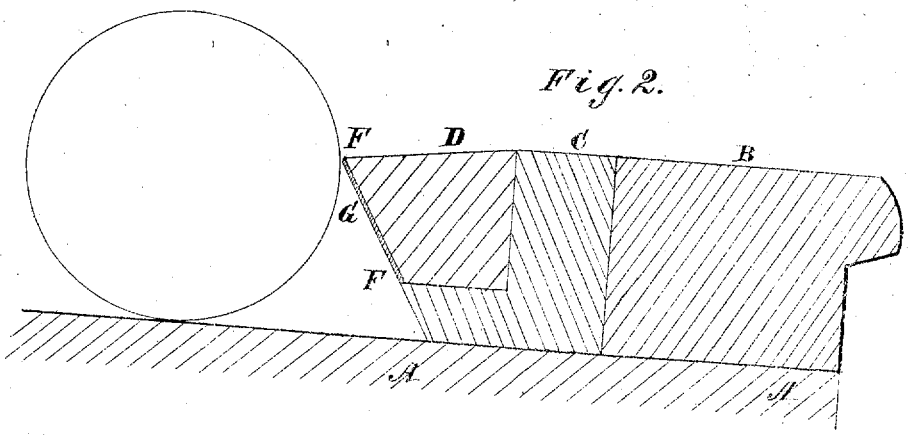

Figure 1 is a cross-section of the cushion, showing the form and relative position of the air-space or chamber to and within the cushion, and the facing upon the cushion, against which the ball impinges. Fig. 2 is a sectional view of cushions of billiard-tables as most generally constructed and used.

A A in said figures represent the table-bed; B, the cushion-rail; C, the soft-wood foundation, to which the India-rubber cushion D is attached in the usual manner. E is an open air-space chamber or cavity, extending through the entire length of the cushions surrounding the table, made of such size and configuration as to afford and present a yielding surface at the moment the ball impinges against the cushion. F F is a facing formed of India rubber, of a harder or more dense character than the rubber D, placed upon the cushion at the point of contact with the billiard-balls, the whole wound with, as usual, muslin, woolen cloth, or other analogous material.

By this mode of construction of cushions for billiard-tables greater elasticity of cushion will be secured than hitherto obtained, for the reason that the elastic properties of the India-rubber cushion, with its open air-space or chamber, will be brought to bear upon the point where the ball strikes or impinges, whereas in the common or usual form of cushions the upper edge, or the point, only comes in contact with the ball and acts, the elastic property of all the rubber below the point G, Fig. 2, being entirely lost. The ball, when it strikes the upper part of the cushion-bevel, in Fig. 1, meets with sufficient resistance to prevent it from jumping, and the facing F F being of a harder material or texture than the cushion itself, operates upon the lower part of said bevel, and causes the air-space, chamber, or cavity to also act as a spring, and by this united action the ball is caused to rebound with the full force of the elastic qualities above referred to. A less quantity of rubber is required to be used (thereby saving much expense in the construction of the cushions) by this form of cushion. The space E is formed in molding, giving uniformity throughout the cushion.

What I claim as my invention, and desire to secure by Letters Patent, is—

1. A cushion for billiard-tables, composed wholly of India rubber or other analogous elastic material, having formed or molded within it an open air-space, chamber, or cavity, its entire length, in its configuration conforming substantially to the shape of the cushion, in the manner and for the purpose herein set forth.

2. In a cushion for billiard-tables, the combination of the open air-space, chamber, or cavity E, cushion D, and facing F, in the manner and for the purpose herein described.

GEORGE DRIVER SHARP.

Witnesses:

HENRY A. BROWN,

D. S. GIRALDI.